United States Patent
Tsuchiya et al.

(10) Patent No.: US 11,620,069 B2
(45) Date of Patent: Apr. 4, 2023

(54) DYNAMIC VOLUME PROVISIONING FOR REMOTE REPLICATION

(71) Applicant: Hitachi, Ltd., Tokyo (JP)

(72) Inventors: Akiyoshi Tsuchiya, San Jose, CA (US); Tomohiro Kawaguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 65 days.

(21) Appl. No.: 17/160,199

(22) Filed: Jan. 27, 2021

(65) Prior Publication Data

US 2022/0236879 A1    Jul. 28, 2022

(51) Int. Cl.
*G06F 3/06* (2006.01)

(52) U.S. Cl.
CPC .............. *G06F 3/065* (2013.01); *G06F 3/067* (2013.01); *G06F 3/0617* (2013.01)

(58) Field of Classification Search
CPC ......... G06F 3/065; G06F 3/0617; G06F 3/067
See application file for complete search history.

(56) References Cited

U.S. PATENT DOCUMENTS

| | | | | |
|---|---|---|---|---|
| 8,078,816 B1 * | 12/2011 | Thoppai | ............ | G06F 16/1844 711/163 |
| 10,592,268 B2 | 3/2020 | Nasu et al. | | |
| 2002/0095470 A1 * | 7/2002 | Cochran | ............ | G06F 11/1425 709/208 |
| 2003/0221074 A1 * | 11/2003 | Satoyama | ............ | G06F 3/0605 714/E11.101 |
| 2006/0143418 A1 * | 6/2006 | Takahashi | ........... | G06F 11/1456 711/114 |
| 2007/0088931 A1 * | 4/2007 | Osaki | .................. | G06F 21/6227 711/173 |
| 2007/0239944 A1 * | 10/2007 | Rupanagunta | ...... | G06F 11/2005 711/147 |
| 2008/0244306 A1 * | 10/2008 | Kumagai | ............ | G06F 11/2069 714/3 |
| 2017/0083251 A1 * | 3/2017 | Karale | ..................... | G06F 3/067 |
| 2018/0011728 A1 * | 1/2018 | Nasu | ..................... | G06F 9/5027 |

* cited by examiner

*Primary Examiner* — Nanci N Wong
(74) *Attorney, Agent, or Firm* — Procopio, Cory, Hargreaves & Savitch LLP

(57) ABSTRACT

Example implementation described herein are directed to a mechanism to provision data volume which requires remote data copy between separated clusters, especially for the container platform. For a request to create a volume made to the clusters, example implementations can involve creating a first volume in a first cluster; obtaining volume information of a corresponding second volume from a second cluster; configuring the first volume and the corresponding second volume in the second cluster to have a remote copy relationship based on the obtained volume information; and setting access from the container to the first volume and the corresponding second volume based on the remote copy relationship.

12 Claims, 16 Drawing Sheets

| Name  | Source Cluster Address   | Destination Cluster Address |
|-------|--------------------------|-----------------------------|
| A-2-B | http://192.168.1.10/A    | http://192.168.2.10/B       |
| A-2-C | http://192.168.1.10/B    | http://192.168.2.10/C       |

FIG. 5

| Name | Storage ID | Pool ID | Address |
|---|---|---|---|
| Pool1 | 1 | 1 | 192.168.1.100 |
| Pool2 | 1 | 2 | 192.168.1.100 |
| Pool3 | 2 | 1 | 192.168.1.200 |

FIG. 6

| Name | Image URL | Volume Claim name | Namespace name |
|---|---|---|---|
| App1 | http://registry1/app1 | vc-1-1,vc-1-2 | ns1 |
| App2 | http://registry2/app2 | None | ns2 |
| App1 | http://registry1/app3 | vc-1-1 | ns3 |

FIG. 7

| Name | Size | Storage Class name | Namespace name |
|---|---|---|---|
| vc-1-1 | 10G | Pool1 | ns1 |
| vc-1-2 | 10G | Pool2 | ns2 |
| vc-1-1 | 50G | Pool3 | ns3 |

FIG. 8

| Name | Volume Claim ref | size | Storage Class Name | Volume ID | Data mobility claim ref | src/dst storage ID | src/dst volume ID |
|---|---|---|---|---|---|---|---|
| volume-1 | vc-1-1 | 10G | Pool1 | 1 | mc-1 | 10 | 3 |
| volume-2 | vc-1-2 | 10G | Pool2 | 2 | mc-3 | 15 | 2 |
| volume-3 | vc-1-1 | 50G | Pool3 | 3 | mc-2 | 20 | 3 |
|  |  |  |  |  | None | None | None |

FIG. 9

| Name | Data Mobility Class Name | Target type | Target name | Purpose | Namespace name |
|---|---|---|---|---|---|
| mc-1 | A-2-B | namespace | ns1 | DR | ns1 |
| mc-2 | A-2-C | container | app1 | Bursting | ns3 |
| mc-1 | A-2-B | volume claim | vc-1-1 | Secondary use of data | ns1 |

FIG. 10

| Source volume ID | Source storage ID | Destination volume ID | Destination storage ID | Status |
|---|---|---|---|---|
| 1 | 1 | 10 | 3 | copied |
| 1 | 1 | 15 | 2 | copying |
| 2 | 1 | 20 | 3 | suspend |

FIG. 11

DYNAMIC VOLUME PROVISIONING FOR REMOTE REPLICATION

BACKGROUND

Field

The present disclosure is generally related to volume provisioning, and more specifically, for facilitating dynamic volume provisioning for remote replication.

Related Art

Container have become utilized to facilitate an agile and flexible application platform. To deploy and manage the containerized application on the clustered multiple servers, a container orchestrator such as Kubernetes is used.

Recently, the containerized application requires data copy between sites. For example, mission or business critical applications require data replication between geographically dispersed sites in order to restart application with replicated data when disaster hits a production site. In addition, application migration between data center for data center consolidation requires data migration.

One of the options that can be used to copy data between clusters is the copy function in the storage system. The copy function copies data from a source volume on a storage system to a destination volume on another storage system. This function can offer efficient and consistent data copy.

For an agile application operation, the application developer requires dynamic volume provisioning which provision volumes for running application dynamically and on-demand when application is deployed. The opposite provisioning is static volume provisioning. In the static volume provisioning manner, volumes are provisioned by administrator before deploying applications. When the application is deployed, the application operator selects and use the pre-provisioned volumes. Compared with the static volume provisioning, deployment with dynamic volume provisioning is agiler because manual operation by administrator can be eliminated.

Therefore, to avoid degrading agility, dynamic volume provisioning is also required for agile application operation when application developers deploy applications that require data copy between Kubernetes clusters with storage functions.

In the related art, there are virtual machine (VM) deployment mechanisms for disaster recovery and high availability configuration using the copy function. In the related art, local and remote sites join the same cluster. The global management of the cluster manages the whole configuration, which includes servers, storages, and network connectivity. When VM is deployed, the global management create copy source volume in local site and copy destination volume in remote site and setup copy between these volumes. After that, global management decide server which source and destination VM is located and create VMs. At the time, the global management relates the volume to VM and maintain the relation information. By this mechanism, when the VM is launched, the volume can be attached to VM.

SUMMARY

In the related art, the precondition is that the copy source and destination belong to same single cluster. Further, the whole configuration is decided and managed by the management module of the cluster.

However, in the distributed system including Kubernetes, if the distance between sites is large, the cluster must be divided into multiple clusters per geographical site. Member instances in distributed systems such as Kubernetes communicate with each other for synchronization of configuration information with a consensus algorithm. If the distance is large, then the network latency between instances becomes long and the mechanism cannot work. Therefore, the cluster must be configured per geographical site.

Therefore, in this case, the related art cannot be applied to this system. The management module is also divided for each cluster. Each management module manages only server and storages within its own cluster.

One applicable approach is to deploy the application to both clusters to create copy source and destination volumes and establish relations between the volume and container accordingly. However, this approach has two problems.

The first problem is that the copy relation cannot be configured between the created volumes in each cluster. Clusters runs independently and do not know configuration information managed by the cluster in opposite site. Therefore, the volume created in the one cluster cannot be recognized by other clusters. Due to this reason, one cluster cannot distinguish which volume should be the copy destination from the plurality of volumes created in the other cluster.

The second problem is that the cluster which has a copy destination volume allows the container to access the volume. The clusters which have the copy destination volumes do not know that the volumes are the copy destination. As the result of allowance of access, this can cause a loss of data because written data will be overwritten by copied data from a copy source volume or written data will overwrite copied data.

Aspects of the present disclosure can include a method for a plurality of clusters, each of the plurality of clusters independently executing a container, the method including, for a request to create a volume made to the plurality of clusters, creating a first volume in a first cluster of the plurality of clusters; obtaining volume information of a corresponding second volume from a second cluster of the plurality of clusters; configuring the first volume and the corresponding second volume in the second cluster to have a remote copy relationship based on the obtained volume information; and setting access from the container to the first volume and the corresponding second volume based on the remote copy relationship.

Aspects of the present disclosure can include a system including plurality of clusters, each of the plurality of clusters independently executing a container, the system including, for a request to create a volume made to the plurality of clusters, means for creating a first volume in a first cluster of the plurality of clusters; means for obtaining volume information of a corresponding second volume from a second cluster of the plurality of clusters; means for configuring the first volume and the corresponding second volume in the second cluster to have a remote copy relationship based on the obtained volume information; and means for setting access from the container to the first volume and the corresponding second volume based on the remote copy relationship.

Aspects of the present disclosure include a computer program storing instructions for a plurality of clusters, each of the plurality of clusters independently executing a container, the instructions including, for a request to create a volume made to the plurality of clusters, creating a first volume in a first cluster of the plurality of clusters; obtaining volume information of a corresponding second volume from a second cluster of the plurality of clusters; configuring the first volume and the corresponding second volume in the second cluster to have a remote copy relationship based on the obtained volume information; and setting access from the container to the first volume and the corresponding second volume based on the remote copy relationship. The computer program can be stored in a non-transitory computer readable medium for execution by one or more processors.

Aspects of the present disclosure can involve an apparatus communicatively coupled to a plurality of clusters, each of the plurality of clusters independently executing a container, the apparatus including a processor, configured to, for a request to create a volume made to the plurality of clusters, create a first volume in a first cluster of the plurality of clusters; obtain volume information of a corresponding second volume from a second cluster of the plurality of clusters; configure the first volume and the corresponding second volume in the second cluster to have a remote copy relationship based on the obtained volume information; and set access from the container to the first volume and the corresponding second volume based on the remote copy relationship.

BRIEF DESCRIPTION OF DRAWINGS

FIG. 5 illustrates an example of a data mobility class table, in accordance with an example implementation.

FIG. 6 illustrates an example of the storage class table, in accordance with an example implementation.

FIG. 7 illustrates an example of the container table, in accordance with an example implementation.

FIG. 8 illustrates an example of a volume claim table, in accordance with an example implementation.

FIG. 9 illustrates an example of a volume table, in accordance with an example implementation.

FIG. 10 illustrates an example of a mobility claim table, in accordance with an example implementation.

FIG. 11 shows an example of copy management table which the storage maintains in its memory, in accordance with an example implementation.

DETAILED DESCRIPTION

Figure 1:
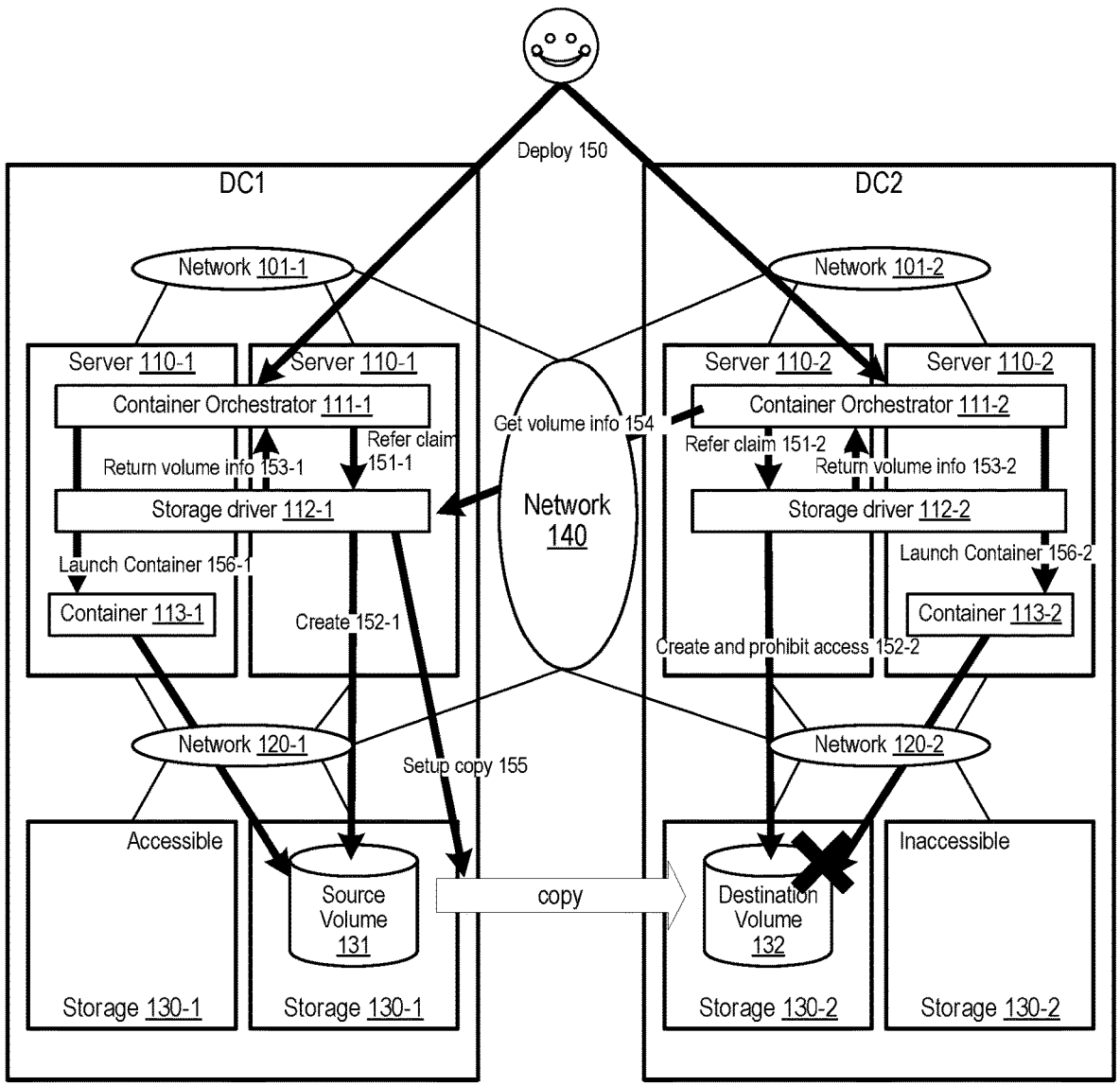
FIG. 1 illustrates an example of an overall system and processing flow when deploying to both clusters, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The example implementations described herein involve facilitating copy between clusters by determining the volume to be the be copy source or destination on an opposite cluster based on the claim and configuration information. In addition, if the volume has not been created yet, a storage driver automatically creates the volume by forwarding the claim. Further, a storage driver determines whether access to volumes is allowable or not based on the claim.

FIG. 1 illustrates an example of an overall system and processing flow when deploying to both clusters, in accordance with an example implementation. This system has at least two data centers, and each data center can involve servers 110-1, 110-2 and storage systems 130-1, 130-2. Each data center is connected via networks 101-1, 101-2, 120-1, 120-2, 140. Servers 110-1, 110-2 are clustered with a container orchestrator 111-1, 111-2 such as Kubernetes, Mesos, or otherwise in accordance with the desired implementation. The storage driver 112-1, 112-2 runs on servers 110-1, 110-2 to allow the container orchestrator 111-1, 111-2 to operate storages 130-1, 130-2. Each server 110-1, 110-2 is connected via network 101-1, 101-2 such as local area network (LAN). Servers 110-1, 110-2 and storage systems 130-1, 130-2 are also connected via network 120-1, 120-2 such as storage area network (SAN). This is a configuration used when using an external storage, and can be applied to the hyper converged architecture if such storage capability is offered by the server. Storage systems 130-1, 130-2 offer the capability to store data to volumes and to replicate data written in the volume to another volume in another storage system. For the storage system 130-1, 130-2, not only hardware storage appliances, but also software defined storages can be utilized in accordance with the desired implementation.

At 150, users deploy applications to both container orchestrators 111-1, 111-2. This request includes a volume claim and a data mobility claim as illustrated at 151-1 and 151-2. Both storage drivers refer to the volume claim and create a volume based on the claim at 152-1, 152-2. At this time, the storage driver which created a copy destination volume 132 prohibits access 152-2 to the created volume. The detail of the processing is described in FIG. 13. By this processing, data loss or corruption can be avoided because the container cannot write data to the copy destination volume.

Next, the storage driver 112-1, 112-2 returns volume information 153-1, 153-2 to the container orchestrator 111-1, 111-2. After that, a storage driver 112-1 gets the volume information 154 from the container orchestrator 111-2 in the other cluster and finds the volume designated to be the copy source 131 or destination of the volume 132 created by the storage driver. The detail of the processing is described in FIG. 14. Based on the information, the storage driver 112-1 creates a copy between the found volume 132 and the volume 131 that the storage driver created at 155. Finally, the container orchestrators 111-1, 111-2 launch the container 113-1, 113-2 at 156-1 and 156-2 respectively. The container 113-1 which uses a copy source volume 131 can access the volume and run its processing. On the other hand, the container 113-2 which uses a copy destination volume 132 cannot access the volume and stops processing because access is prohibited by a storage driver 112-2.

Figure 2:
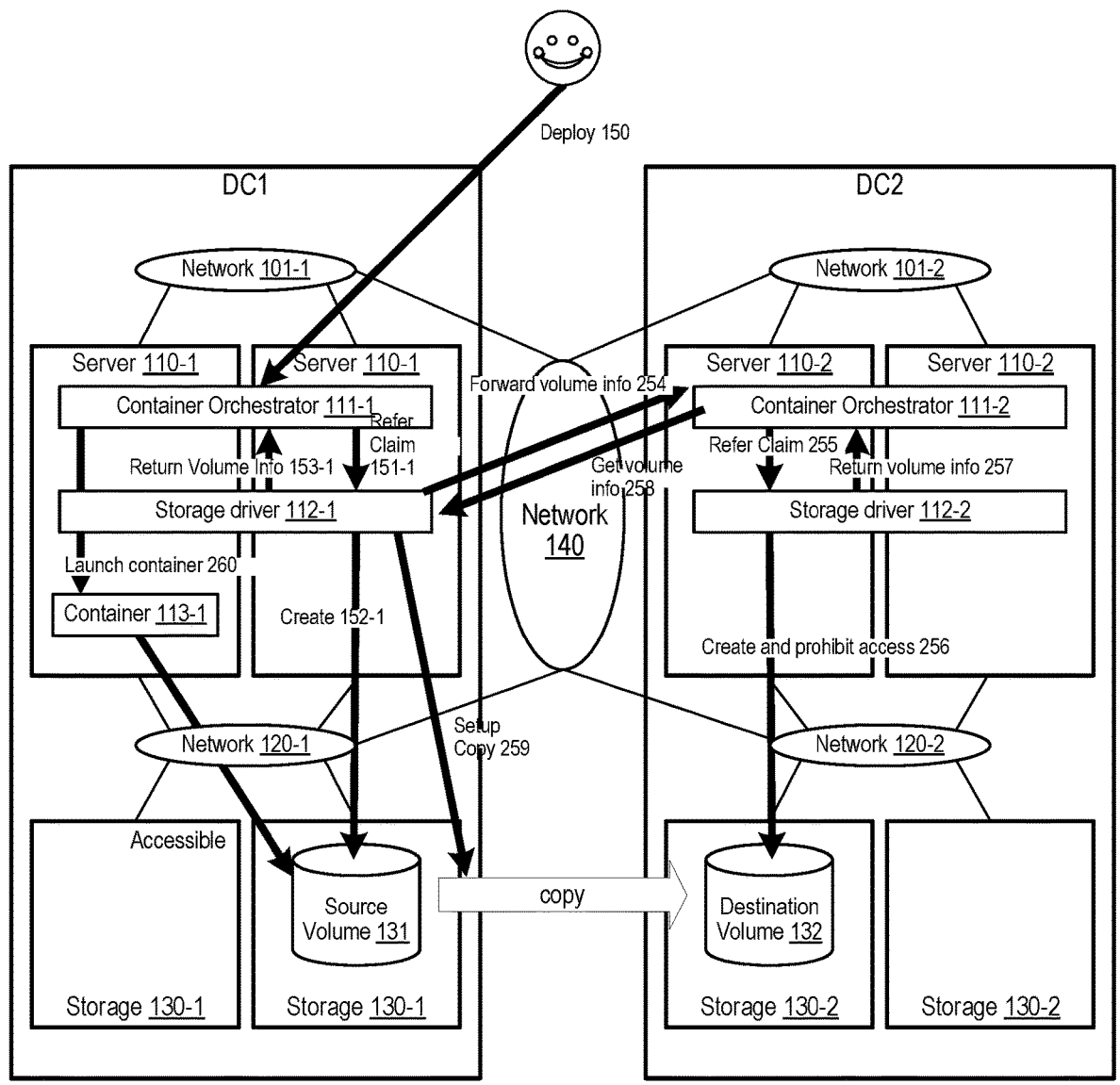
FIG. 2 illustrates an example of an overall system and processing flow when deploying to only one cluster, in accordance with an example implementation.

FIG. 2 illustrates an example of an overall system and processing flow when deploying to only one cluster, in accordance with an example implementation. The system configuration is same as FIG. 1. The operation approach described in FIG. 2 is suitable for disaster recovery (DR) with the cold-standby because fewer computing resources are required than the operation in FIG. 1. Only the volume is deployed to data center DC2 and an application is not deployed. Therefore, resource consumption is smaller.

Both operation approach is covered by the first example implementation described herein.

At 150, users deploy applications to a container orchestrator 111-1. This request includes a volume claim and a data mobility claim. Similar to FIG. 1, the storage driver refers to the volume claim at 151-1, creates a volume 152-1 and returns information of the created volume 153-1 to the container orchestrator 111-1. After that, the storage driver 112-1 forwards the claim to another container orchestrator 111-2 at 254. In response to this, the storage driver 112-2 in the other cluster refers to the claim at 255 and creates a volume at 256. At this time, similar to FIG. 1, the storage driver prohibits access to the volume. Next, the storage driver 112-2 returns the volume information to container orchestrator 111-2 at 257. After that, the storage driver 112-2 returns the information of the created volume to the container orchestrator 111-2. Storage drivers obtains volume information from the container orchestrator of another side data center (DC) at 258 and finds the volume (e.g., either the copy source or destination of the volume) which the storage driver created. Based on the found information, storage driver facilitates the copy between volumes at 259. Finally, the container orchestrator which user deploy application launches container at 113-1 at 260.

Figure 3:
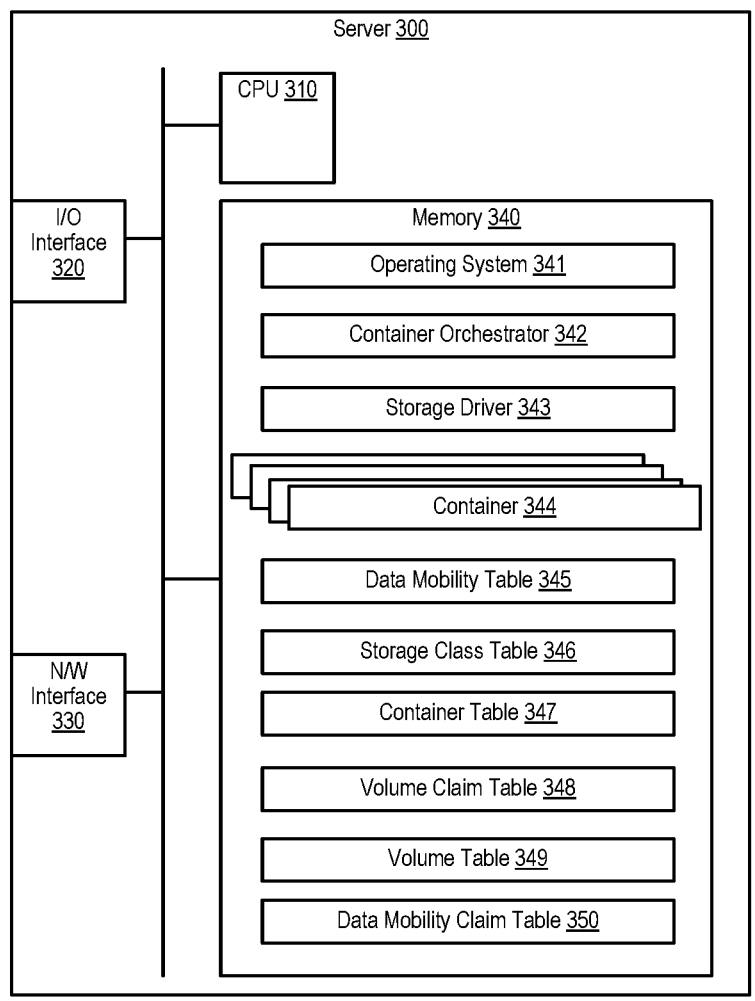
FIG. 3 illustrates an example of hardware configuration of servers, in accordance with an example implementation.

FIG. 3 illustrates an example of hardware configuration of servers, in accordance with an example implementation. To reduce memory consumption, data in tables can be stored in non-volatile media wherein a portion of the data can be cached in memory.

Server 300 can include central processing unit (CPU) 310, input/output (I/O) interface 320, network (N/W) interface 330 to interact with network 101-1, 101-2 and 140, and memory 340. CPU 310 can be made of one or more physical hardware processors, or a combination of hardware and software. Memory 340 can maintain programs or tables for Operating System 341, Container Orchestrator 342, Storage Driver 343, Container 344, Data Mobility Table 345, Storage Class Table 346, Container Table 347, Volume Claim Table 348, Volume Table 349, and Data Mobility Claim Table 350. The elements of memory 340 can be loaded or executed on CPU 310 in accordance with the desired implementation.

The container orchestrator 342 accepts the deployment request from users and executes containers based on the request. The storage driver 343 offers storage operation capability to the container orchestrator 342. Containers 344 are containers which the user would like to execute. The tables are for managing the user request and resources. Further details are provided with respect to FIGS. 5-11. Programs are loaded to the central processing unit (CPU) 310 and the CPU 310 executes the programs.

Although the example implementations are described herein with respect to container management and container execution, other types of computing unit management can also be facilitated by the example implementations described herein. For example, other computing units can include virtual machines (VMs), application programs, programs, processes, threads, and jobs facilitated by the servers and storage systems in accordance with the desired implementation. For example, it is possible to run VMs on container orchestrators, and conversely, to run containers on VM orchestrators. A process is another example of a computing unit which serves as a unit of management when an operating system (OS) executes a program on a computer. A thread is another type of computing unit that serves as a unit of management when the OS executes a program, and is a more granular division of a process. A job is another type of computing unit that requests execution of a process (e.g., batch processing execution) in supercomputers and mainframes. Thus, the example implementations can be modified to facilitate other computing units in accordance with the desired implementation.

Figure 16:
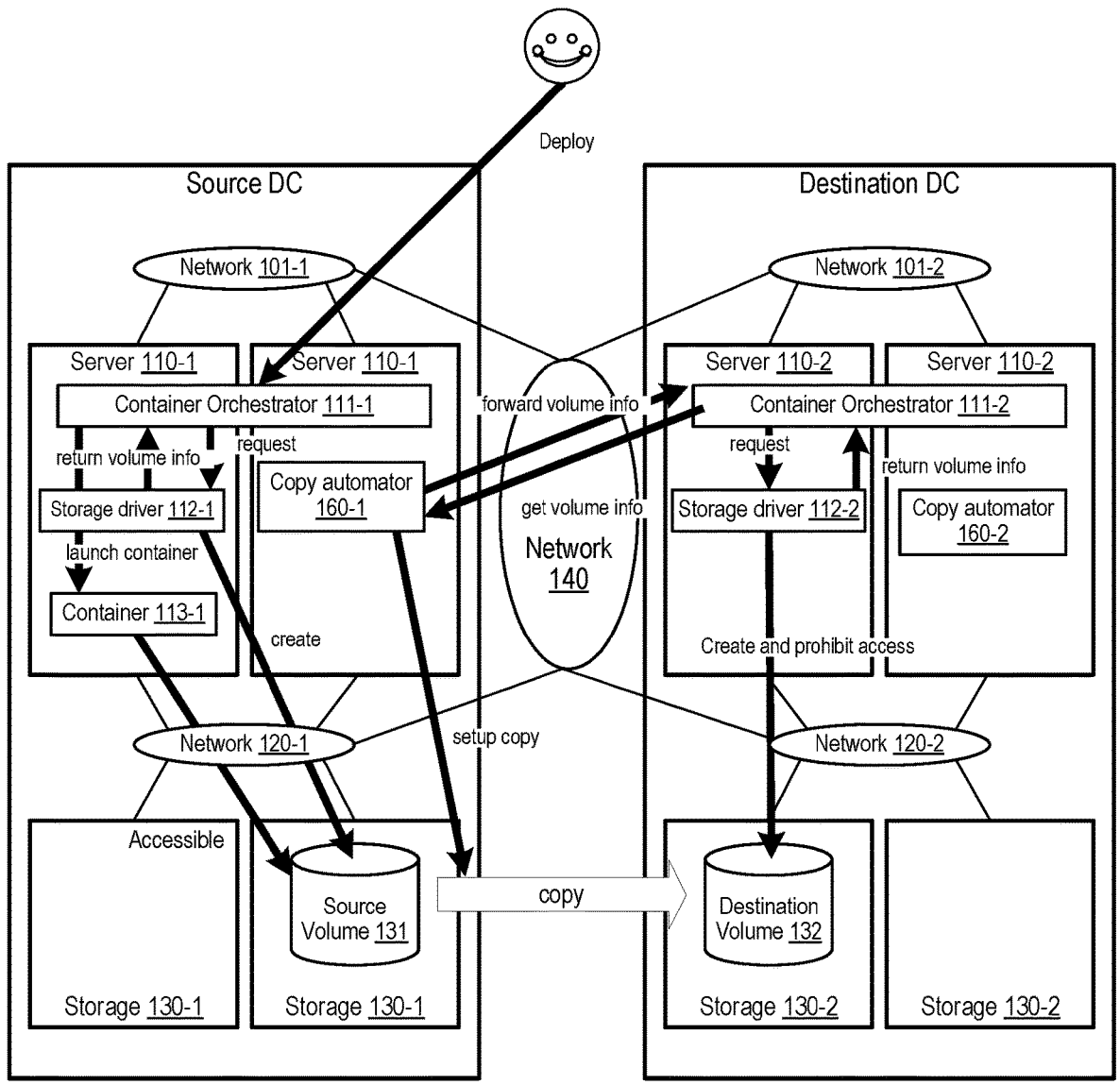
FIG. 16 illustrates another example of the overall system and processing flow, in accordance with an example implementation.

For example, CPU 310 can be configured to, for a request to create a volume made to the plurality of clusters, create a first volume in a first cluster of the plurality of clusters; obtain volume information of a corresponding second volume from a second cluster of the plurality of clusters; configure the first volume and the corresponding second volume in the second cluster to have a remote copy relationship based on the obtained volume information; and set access from the computing unit to the first volume and the corresponding second volume based on the remote copy relationship as illustrated in FIGS. 1, 2 and 16.

Figure 12:
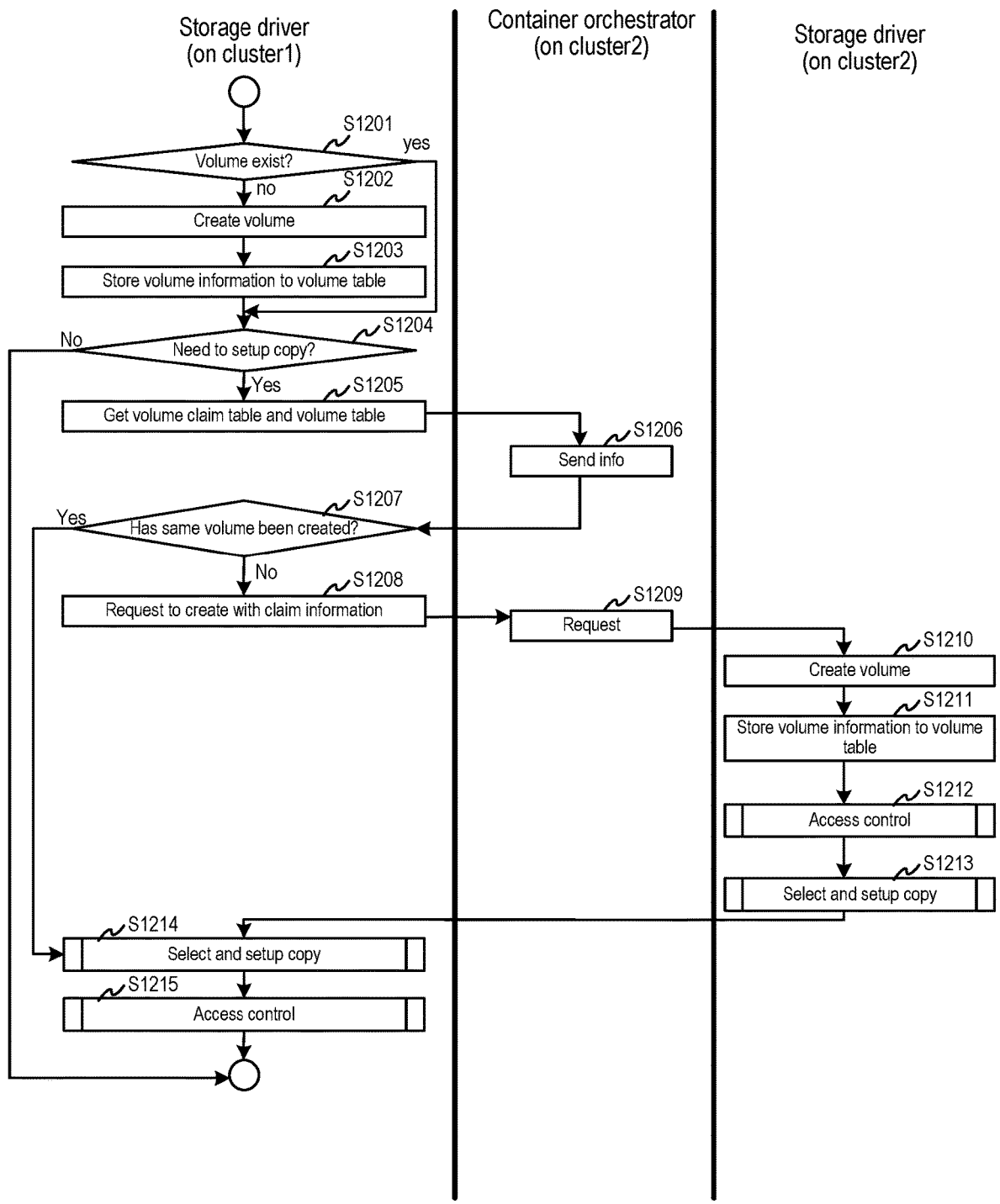
FIG. 12 illustrates an example of processing flow of preparing volume with setting up data copy between volumes, in accordance with an example implementation.

CPU 310 can be configured to configure the first volume and the corresponding second volume to have the remote copy relationship and the setting the access from the computing unit to the first volume and the corresponding second volume based on the remote copy relationship for when it is determined that the second cluster contains the corresponding second volume meets conditions in the volume information as illustrated in S1207, S1214, and S1215 of FIG. 12.

CPU 310 can be configured to, for a determination that the second cluster does not have the corresponding second volume meeting conditions in the volume information, create the corresponding second volume in the second cluster to meet the conditions in the volume information, wherein the configuring the first volume and the corresponding second volume in the second storage cluster to have the remote copy relationship based on the obtained volume information, and the setting the access from the computing unit to the first volume and the corresponding second volume based on the remote copy relationship is conducted in response to the creating of the corresponding second volume as illustrated in S1207 to S1213 of FIG. 12.

CPU 310 can be configured to configure the first volume and the corresponding second volume in the second cluster to have the remote copy relationship based on the obtained volume information according to the determination that the corresponding second volume is to be configured to have the remote copy relationship with the first volume in the first cluster; and, for the determination that the corresponding second volume is to be configured to have the remote copy relationship with the first volume in the first cluster, CPU 310 is configured to obtain volume information indicative of the plurality of volumes in the first cluster and the second cluster and obtaining claim information indicative of relationships between a plurality of volumes in the first cluster and a plurality of volumes in the second cluster as illustrated in S1205 and S1206.

Figure 13:
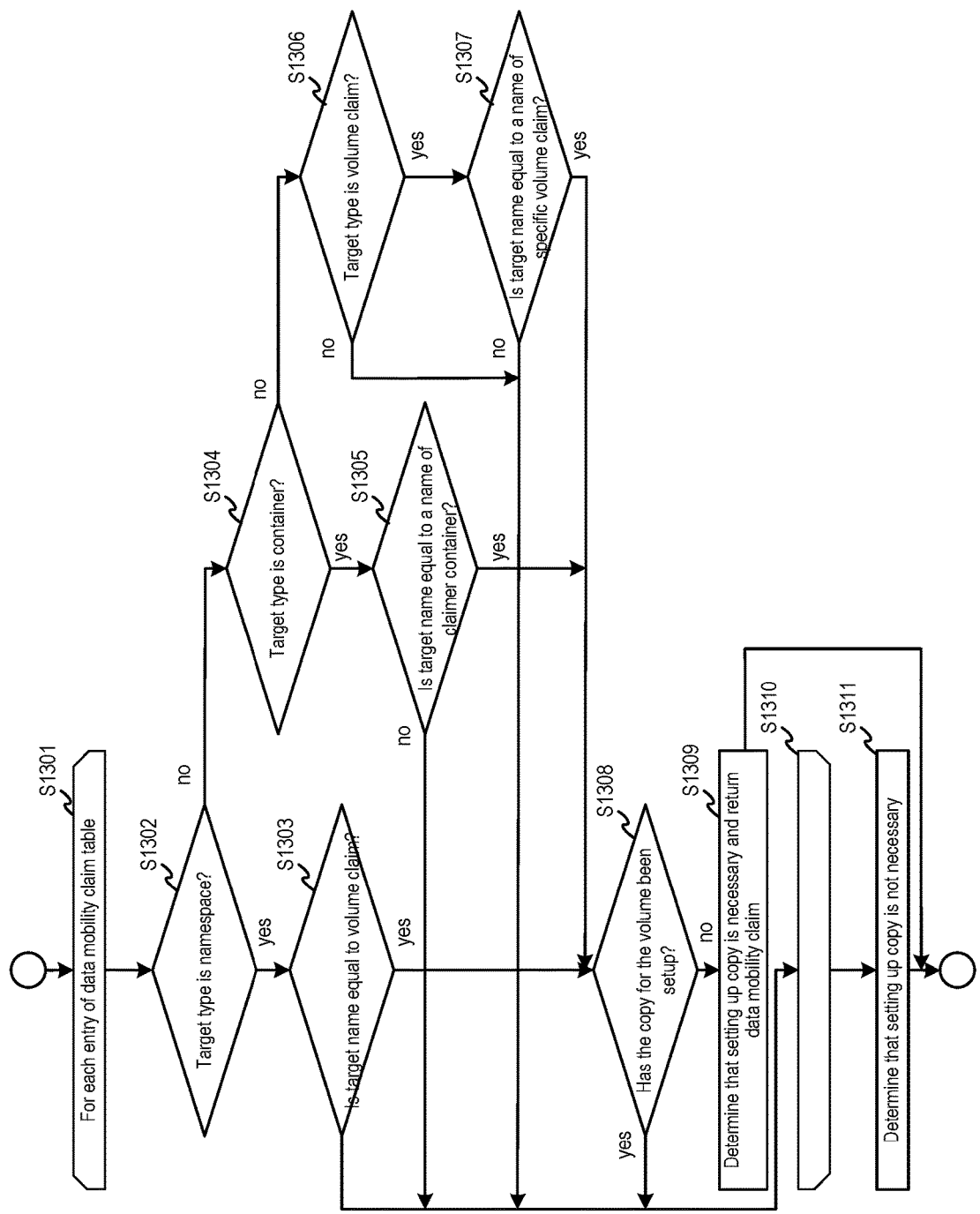
FIG. 13 illustrates an example of a processing flow to determine the necessity of setting up the copy, in accordance with an example implementation.

CPU 310 can be configured to determine whether setup of the remote copy of the first volume is needed, by determining that a volume claim information corresponding to the first volume has a relationship with copy claim information indicative of requiring the remote copy; and determining that the setup of the remote copy of the first volume is needed if the volume claim has a relationship with the copy claim information being indicative of requiring the remote copy and the remote copy relationship has not been established against the first volume as illustrated in FIG. 13 and in S1204 of FIG. 12.

Figure 14:
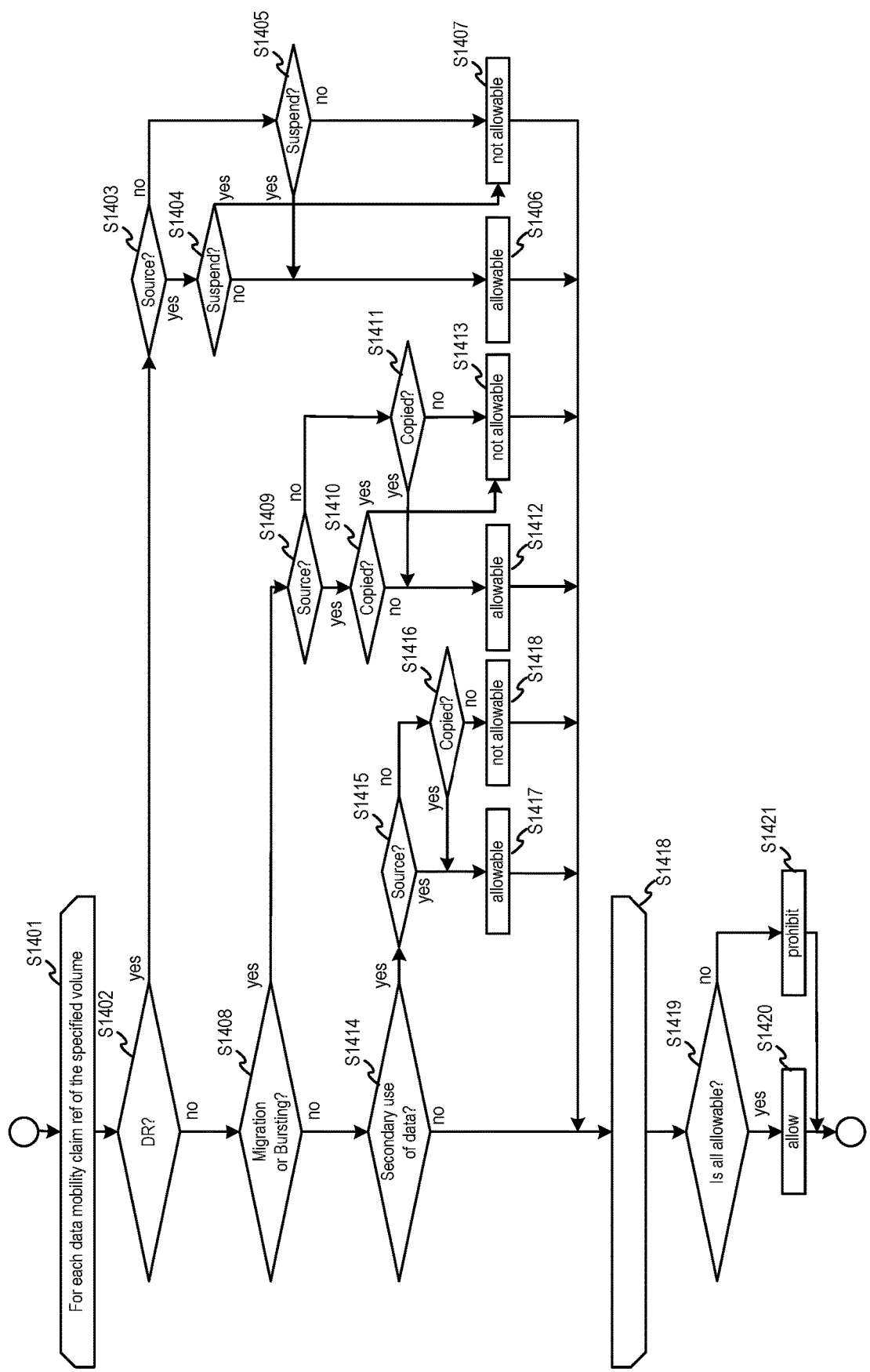
FIG. 14 illustrates an example of processing the flow of access control function, in accordance with an example implementation.

CPU 310 can be configured to set the access from the computing unit to the first volume and the corresponding second volume based on the remote copy relationship by determining whether the access from the computing unit can be granted based on a copy status and copy claim information indicative of a purpose of remote copy; granting the access from the computing unit to ones of the first volume and the corresponding second volume when the determination is that access from computing unit can be granted; and denying the access from the computing unit to the ones of the first volume and the corresponding second volume when the determination is that access from computing unit cannot be granted as illustrated in FIG. 14. In an example, determining whether the access from the computing unit to the first volume and the corresponding second volume can be granted based on the copy status and the copy claim information indicative of the purpose of the remote copy can involve, for the first volume and the corresponding second volume having the copy claim information indicative of the purpose of disaster recovery, determining that the access from the computing unit to the ones of the first volume and the corresponding second volume being a copy source having an unsuspended copy status or a copy destination having a suspended copy status can be granted; and determining that the access from the computing unit to the ones of the first volume and the corresponding second volume being the copy source having a suspended copy status or the copy destination having an unsuspended copy status cannot be granted as illustrated as S1406 and S1407 of FIG. 14. In another example, determining whether the access from the computing unit to the first volume and the corresponding second volume can be granted based on the copy status and the copy claim information indicative of the purpose of the remote copy can involve, or the first volume and the corresponding second volume having the copy claim information indicative of the purpose of bursting or migration, determining that the access from the computing unit to the ones of the first volume and the corresponding second volume being a copy source having a not copied status or a copy destination having a copied status can be granted; and determining that the access from the computing unit to the ones of the first volume and the corresponding second volume being the copy source having the copied status, or the copy destination having the not copied status cannot be granted as illustrated at S1412 and S1413 of FIG. 14. In another example, the determining whether the access from the computing unit to the first volume and the corresponding second volume can be granted based on the copy status and the copy claim information indicative of the purpose of the remote copy can involve, for the first volume and the corresponding second volume having the copy claim information indicative of the purpose of secondary use of data, determining that the access from computing unit to the first volume and the corresponding second volume having a copied status can be granted as illustrated at S1417 of FIG. 14.

Figure 15:
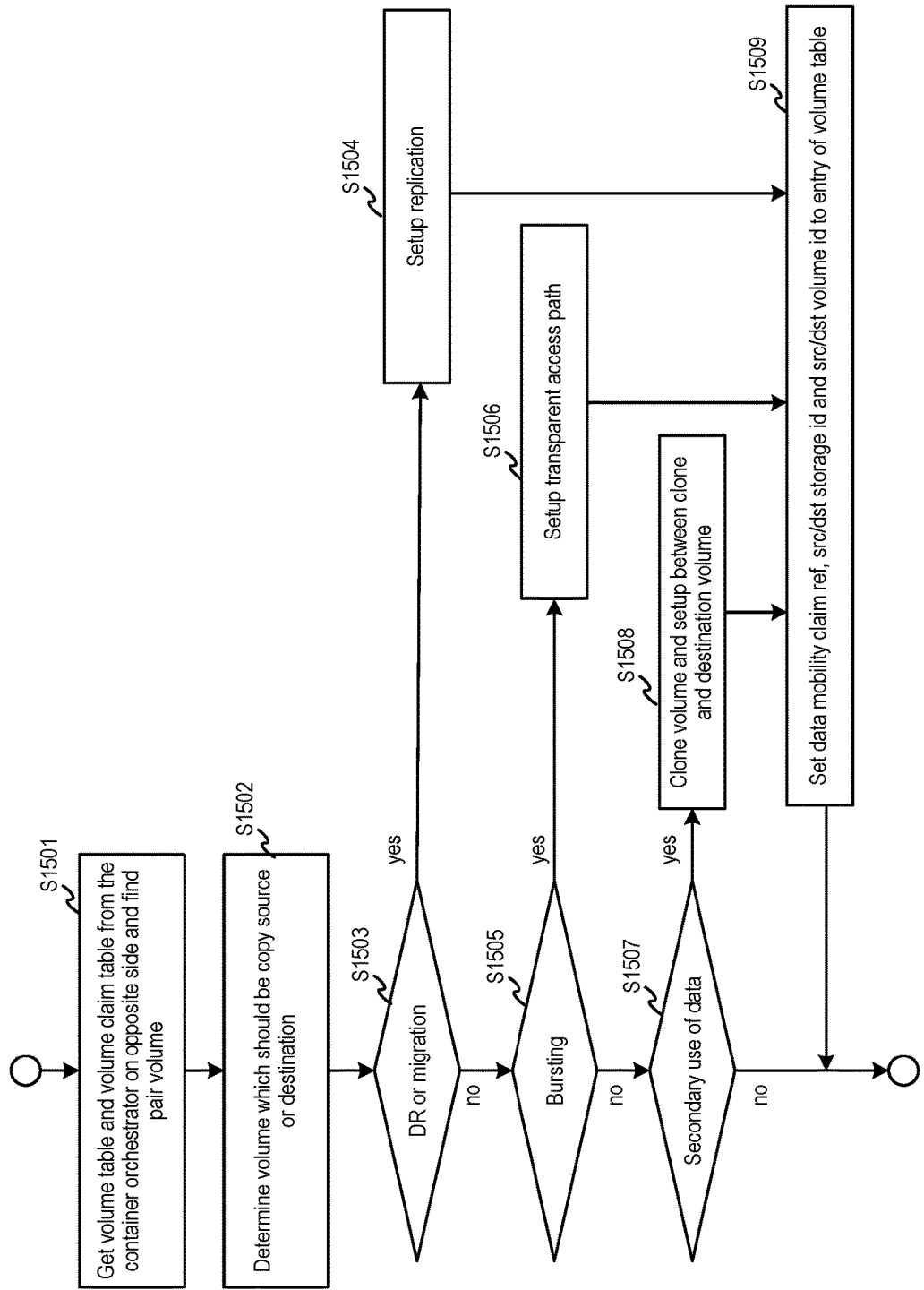
FIG. 15 illustrates an example of processing flow of select and setup copy function, in accordance with an example implementation.

CPU 310 can be configured to configure the first volume and the corresponding second volume in the second cluster to have the remote copy relationship based on the obtained volume information by setting one of the first volume and the corresponding second volume as a copy source volume and another one of the first volume and the corresponding second volume as a copy destination volume; determining a remote copy method based on copy claim information indicative of a purpose of the remote copy; and configuring the determined remote copy method between the copy source volume and the copy destination volume as illustrated in FIG. 15. For example, the determining the remote copy method can involve, for the copy claim information indicative of the remote copy relationship to be disaster recovery or migration, configuring the first volume and the corresponding second volume to facilitate replication; for the copy claim information indicative of the remote copy relationship to be bursting, configuring a transparent access path between the first volume and the corresponding second volume; and for the copy claim information indicative of the remote copy relationship to be secondary use of data, configuring the copy destination volume to be a clone of the copy source volume.

Figure 4:
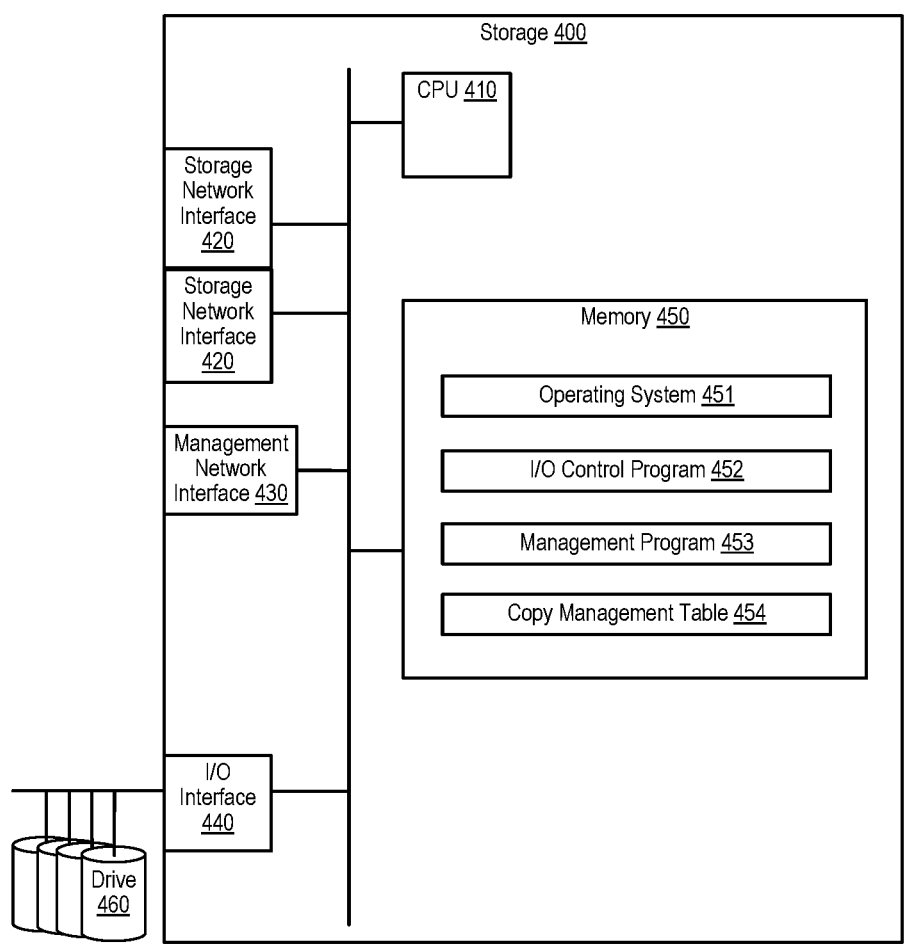
FIG. 4 illustrates an example of hardware configuration of storages, in accordance with an example implementation.

FIG. 4 illustrates an example of hardware configuration of storages 400, in accordance with an example implementation. To reduce memory consumption, data in tables can be stored in non-volatile media wherein a portion of the data can be cached in memory.

Storages 400 can involve storage network interface 420 to interact with network 120-1, 120-2, management network interface 430 to interact with network 430, and I/O interface 440 to interact with the physical drives 460. Memory 450 can maintain operating system 451, I/O control program 452, management program 453, and copy management table 454.

The I/O control program 452 controls data input and output (I/O) requested to the volumes by the containers running on servers. I/O control program 452 accepts I/O requests via the storage network interface. Data is stored into drives connected via I/O interface. I/O control program 452 also controls the data copy based on the copy management table. I/O control program 452 also copies the data via storage network interface.

Management program 453 facilitates an operation interface. This interface is offered as RESTful application programming interface (API), command line interface (CLI), and so on, in accordance with the desired implementation. Through this interface, storage drivers running on servers request operations such as creating the volume, setting up the copy, and obtaining information of the volume or the copy status. Management program accepts requests via management network interface.

Copy management table 454 manage copy relation between volumes and copy status.

These programs are loaded to CPU 410 and executed by the CPU 410.

FIG. 5 illustrates an example of a data mobility class table 345, in accordance with an example implementation. Data mobility classes are definitions that represent the cluster relations regarding which applications are mobile. Data mobility classes are defined by administrators based on hardware configuration. Data mobility class table maintains the defined classes. Each entry has a name, a source cluster address and a destination cluster address. Name is an identifier of the data mobility class. Source cluster address is an address to access the container orchestrator of the copy source data center. Destination cluster address is the address information to access container orchestrator of the copy source data center. An example of address information can include a pair of an internet protocol (IP) address and port number, and/or a uniform resource locator (URL). If an access credential is required to access source and destination clusters, the credential is also maintained by this table.

FIG. 6 illustrates an example of the storage class table 346, in accordance with an example implementation. Each storage class has information indicative of a storage pool which the container can use. Storage classes are defined by administrators based on the hardware configuration. Each entry has name, storage identifier (ID), pool ID and address. Name is an identifier of the storage class. Storage ID is an ID of the storage corresponding to the storage class. Pool ID is an identifier of the storage pool corresponding to the storage class. Storage pool is the logical capacity pool consisting of multiple drives. Storage pools are configured in a storage. Volumes are created by consuming the capacity of the pool. Address is the information to send the request to management program of the storage corresponding to the storage class, such as a pair of IP address and port number, or a uniform resource locator (URL) as applicable.

For the setup of storage pools to use copy between volumes, the administrator defines storage classes with the same name between clusters.

FIG. 7 illustrates an example of the container table 347, in accordance with an example implementation. Container table maintains the container information. To execute the container, users send this information as the container deployment request.

Each entry has the name, image URL, volume claim name and Namespace name. Name is an identifier of container. Image URL is information to indicate where the container image is stored. When the application is deployed by users, container orchestrator obtains a container image based on this information if the image has not been downloaded yet. Volume claim names are identifiers of volume claim used by the container. Namespace name is a name of the namespace in which the container is executed. Namespaces are logical partitions to share container platforms among multiple users. One user uses specific namespaces and cannot see and modify information in the namespaces used by others.

These are examples and other information can be managed by this table. For example, the number of replicas is stored when same containers are redundantly executed. Another example is CPU and memory resource information which these containers requires to run.

FIG. 8 illustrates an example of a volume claim table 348, in accordance with an example implementation. A volume claim is a request to create a volume. As one of the manifests of the application, users define this information and deploy to the container orchestrator. The relation between a container and a volume claim is maintained in the container table by pointing to the volume claim in an entry of the container table. A container orchestrator manages the volume claim with this table. In addition, a storage driver refers to this table to get claim information. A volume claim is pointed from an entry of volume table as described in FIG. 9.

Each entry has name, size, storage class name and namespace name. Name is an identifier of a volume claim. Size is requested size of a volume. Storage class name is a name of a storage class from which the volume is created. Namespace name is a name of the namespace to which the volume claim belongs.

FIG. 9 illustrates an example of a volume table 349, in accordance with an example implementation. A container orchestrator manages information of volumes created by a storage driver. Each entry has name, volume claim reference, size, storage class name, volume ID, data mobility claim reference, source/destination storage ID and source/destination volume ID. Name is the identifier of the volume in the container orchestrator. Volume claim reference is a pointer to the volume claim which requested to create the volume. Size is volume size information. Storage class name is a pointer to the storage class from which the volume was created. Volume ID is an identifier of the volume in storage. Data mobility claim references are pointers to the data mobility claim. When a storage driver sets up a copy from or to this volume based on the data mobility claim, a storage driver adds the data mobility claim to this field. None means that the copy has not been set up for this volume. By this field, a storage driver can determine whether copy has been setup for each volume or not.

Source/destination storage ID is the identifier of the storage which has copy source or destination volume corresponding to the volume. Source/destination volume ID is the identifier of the volume which is the copy source or destination volume corresponding to the volume.

Based on the container table and the volume table, the container orchestrator specifies the volume when a container orchestrator launches a container. The container orchestrator refers to the container table and specifies the volume claim name required by the container. Next, the container orchestrator specifies the volume by searching the volume table with the specified volume claim names.

FIG. 10 illustrates an example of a mobility claim table 350, in accordance with an example implementation. A data mobility claim is a request to copy data to give the target resource mobility. This claim is also one of the manifests of the application. Users defines the data mobility claim and deploys to a container orchestrator. The container orchestrator manages data mobility claims with this table.

Each entry has a name, data mobility class name, target type, target name, purpose and namespace name. Name is an identifier of a data mobility claim. Data mobility class name is the name of data mobility class. With this information, users specify which mobility class is to be used. Target type is a type of target to which users want to give mobility. If the target type is "volume claim", only one volume corresponding the volume claim is copied. If the target type is "namespace", all volumes which corresponding volume claims belong to a specified namespace. If the target type is "container", all volumes which a specified container uses are copied. Target name is name of the target.

Purpose is a purpose of the data copy. Based on the field, a storage driver selects an appropriate copy method and conducts the setup. Disaster Recovery (DR), migration, bursting and secondary use of data is an example of the value of this field. Namespace name is a name of the namespace to which a data mobility claim is deployed.

FIG. 11 shows an example of copy management table 354 which the storage maintains in its memory, in accordance with an example implementation. The storage inserts a new entry to this table when a storage configures copy in response to a request from storage drivers.

Each entry has source volume ID, source storage ID, destination volume ID, destination storage ID and status. Source volume ID is an identifier of the volume that is a copy source. Source storage ID is an identifier of the storage that owns the source volume. Destination volume ID is an identifier of the volume that is a copy destination. Destination storage ID is an identifier of the storage which owns the destination volume. Status is a copy status. This field indicates copy is ongoing, completed or suspended.

FIG. 12 illustrates an example of processing flow of preparing volume with setting up data copy between volumes, in accordance with an example implementation. The storage driver refers to the volume claim table and detects new claims or modified claim. When a storage driver detects them, the storage driver starts this processing.

First, a storage driver confirms whether the volume has been created at S1201. To do this, a storage driver search the claim reference field of volume table 349. If there is a volume for which the claim ref is equal to the passed volume claim (Yes), the storage driver judges that volume has already been created and proceeds to S1204. Otherwise (No), the storage driver judges that volume has not been created yet and proceeds to S1202. When the volume has not been created yet, the storage driver creates the volume at S1202. To create a volume, a storage driver requests a storage to create volume. The storage information is achieved from the storage class pointed from the volume claim. After creation of a volume, a storage driver inserts a new entry to the volume table 349 at S1203.

Next, the storage driver confirms whether the volume is required to setup the copy at S1204. The detail of this processing is described in FIG. 13. If setting up the copy is not necessary for this volume claim (No), then the processing is completed. If setting up the copy is necessary (Yes), the storage driver executes the following processing. At S1205, the storage driver requests the container orchestrator on the other cluster to obtain the volume claim table and the volume table. The information of the container orchestrator is achieved from the data mobility class referred from the data mobility claim. which is found from the data mobility claim table 350 by processing described in FIG. 13. In response to this request, the container orchestrator on the other cluster sends the tables at S1206. To reduce the amount of transferred data, the entry can be filtered. For example, the entry can be filtered by namespace name or name for volume claim table and claim ref for volume table.

Next, the storage driver judge whether the volume that is to be copy source or destination of the volume being processed has already been created at S1207. If a volume satisfying all of the following conditions exists in the volume table (Yes), then the storage driver determines that the volume has been created.

Claim ref is same as the name of the volume claim being processed
Namespace name of the volume claim corresponding to the volume is the same as the volume claim being processed
Storage class name is the same as the volume claim being processed Satisfying all of these conditions means that the volume is created from the same manifest by the same users. Therefore, the storage driver can avoid conducting a setup copy with a volume that should not be the copy source or destination.

If volume has not been created yet (No), the storage driver forwards the volume claim and data mobility claim to the opposite container orchestrator in order to create the volume in the opposite cluster at S1208 and S1209. Then, like the storage driver on the first cluster, the storage driver on the opposite cluster detects the new volume claim, create a volume in a storage at S1210, and stores the volume information into a volume table at S1211. After that, the storage driver calls the access control function described in FIG. 14 at S1212 and selects the setup copy function described in FIG. 15 at S1213. If copy function can be configured by operation from the single storage, S1213 can be omitted.

If volume has already been created (Yes), the storage driver skips the processing. Further, the storage driver on the first cluster also calls access control function as described in FIG. 14 at S1214, and selects the setup copy function described in FIG. 15 at S1215.

FIG. 13 illustrates an example of a processing flow to determine the necessity of setting up the copy, in accordance with an example implementation. This processing receives a volume claim as an argument. This processing is executed by a storage driver.

A storage driver executes processing from S1301 to S1310 for each entry of data mobility claim table 350.

At S1302, if the target type of this entry is namespace (Yes), the flow proceeds to S1303, and if the target name of this entry is equal to a namespace name of the volume claim (yes) and at S1308, the copy has not been setup for the volume corresponding to the specified volume claim (No), the storage driver determines that setting up the copy is necessary and returns the data mobility class being processed to caller processing at S1309. At S1308, the storage driver determines that the copy has not been set up if name of the data mobility claim being processed is included in data mobility claim ref field of the volume corresponding to the specified volume claim.

If the target type of this entry is container (S1302 is no and S1304 is yes), target name of this entry is equal to a name of container which is claimer of the volume claim (S1305 is yes) and copy has not been setup for the volume corresponding to the specified volume claim (S1308 is no), the storage driver determine that setting up copy is necessary and returns the data mobility class being processed to caller processing at S1309.

If the target type of this entry is volume claim (S1302 is no, S1304 is no and S1306 is yes), target name of this entry is equal to a name of the specified volume claim (S1307 is yes) and copy has not been setup for the volume corresponding to the specified volume claim (S1308 is no), the storage driver determine that setting up copy is necessary and return the data mobility class being processed to caller processing at S1309.

If not, the storage driver proceeds to a next entry at S1310.

When there is no entry indicating that the copy setting is necessary for the specified volume claim after the processing for all the entries, the storage driver determines that the copy setting for this volume is not necessary at S1311.

FIG. 14 illustrates an example of processing the flow of access control function, in accordance with an example implementation. This function receives a volume information and a corresponding volume claim as arguments from a caller. This processing is executed by a storage driver.

First, the function checks each data mobility claims which are pointed from the volume information by the data mobility claim ref field at S1401, and executes the process from S1402 to S1418.

If the purpose of the passed data mobility claim is disaster recovery (DR) (S1402 is yes), the function proceeds to S1403. If the volume is a copy source (S1403 is yes) and the copy status is not suspended (S1404 is no), or if the volume is copy destination (S1403 is no) and the copy status is suspended (S1404 is yes), the function determines that access to the volume is allowable at S1406. If the volume is a copy destination (S1403 is no) and the copy status is not suspended (S1404 is no), or if the volume is a copy source (S1403 is yes) and the copy status is suspended (S1404 is yes), the function determines that access to the volume should be prohibited at S1407.

By achieving the copy management table from the storage and confirming whether the volume is the copy source, the function determines whether the volume is the copy source or not. Further, copy status is also determined according to the copy management table.

If the purpose of the passed data mobility claim is migration or bursting (S1408 is yes), the function proceeds to S1409. If the volume is a copy source (S1409 is yes) and copy status is not copied (S1410 is no), or if the volume is a copy destination (S1409 is no) and the copy status is copied (S1410 is yes), the function determines that the access to the volume is allowable at S1412. If the volume is a copy destination (S1409 is no) and the copy status is not copied (S1411 is no), or if the volume is a copy source (S1403 is yes) and the copy status is copied (S1410 is yes), the function determines that the access to the volume should be prohibited at S1413.

If the purpose of the passed data mobility claim is secondary use of data (S1414 is yes), the function proceeds to S1415. If the volume is a copy source (S1415 is yes), or if the volume is a copy destination (S1415 is no) and the copy status is copied (S1416 is yes), the function determines that the access to the volume is allowable at S1417. If not, the function determines that the access to the volume should be prohibited at S1418.

Based on the determination result against each data mobility class pointed from the volume, the function determines whether access to the volume can be allowed. If all determinations against each data mobility claim are allowable (S1419 is yes), the function allows to access the volume at S1420. If not (S1419 is no), the function prohibits to access the volume at S1421.

FIG. 15 illustrates an example of processing flow of select and setup copy function, in accordance with an example implementation. A volume (entry of volume table) and a corresponding volume claim and data mobility claim is specified by the caller with arguments.

At S1501, the function gets a volume claim table and a volume table from the container orchestrator on the cluster to which the copy source or destination volume should be placed. The address of the container orchestrator to send the request is obtained from the data mobility class pointed from the data mobility class passed as an argument. Similar to S1205, to reduce amount of transferred data, entries can be filtered. For example, entries can be filtered based on namespace name or name for volume claim table and claim ref for volume table. In addition, S1501 can be omitted if these tables are cached in container orchestrators.

Next, at S1502 from the achieved volume table, the function determines a volume which should be a copy source or destination of the specified volume. The method is same as S1207. The volume which satisfies all of the following conditions is the volume to be used:

Claim ref is the same as the name of specified volume claim

Namespace name of the volume claim corresponding to the volume is same as the specified volume claim Same storage class name is the same as the specified volume claim Next, the function selects the appropriate copy method and conducts the setup between the specified volume and the volume determined at S1502.

If the purpose of the specified data mobility claim is DR or migration (S1503 is yes), the function selects data replication and conducts the setup at S1504. To setup replication, the function requests a storage to configure it with a specified storage ID and volume ID of copy source and destination. The specified volume information and the volume which is determined at S1502 contains the needed information.

If the purpose of the specified data mobility claim is bursting (S1505 is yes), the function selects establishing transparent access path from destination to source and conducts the setup at S1506. To conduct the setup, the function requests a storage to configure it with the specified storage ID and volume ID of the copy source and destination. The specified volume information is achieved with same method as S1504.

If the purpose of the specified data mobility claim is secondary use of data (S1507 is yes), the function selects the cloning source volume and copying the clone to destination volume at S1507. To conduct the setup, the function requests a storage to clone and setup copy between the clone and the destination volume.

Finally, the function stores the following information to the specified volume entry of the volume table:

a name of the specified data mobility claim to data mobility claim ref field a storage ID of the volume determined at S1502 to src/dst storage id field a volume ID of the volume determined at S1502 to src/dst volume id field FIG. 16 illustrates another example of the overall system and processing flow, in accordance with an example implementation. In this example implementation, storage driver is divided into storage driver 112-1, 112-2 and copy automator 160-1, 160-2. The processing algorithm is same as described in FIGS. 1-15. However, a part of the storage driver processing is facilitated by a copy automator 160. A storage driver dedicates itself to handle local volumes such as creating, resizing, and deleting volumes in response to deploying and modifying volume claims. Instead of a storage driver, a copy automator 160-1, 160-2 communicates with the other container orchestrator 111-2, facilitates the setup copy and conducts access control in response to deploying and modifying the data mobility claim.

When the existing storage driver does not have the functionality to facilitate setting up the copy between volumes in different storages, this example implementation facilitates the function to the system by adding the copy automator 160-1, 160-2 without stopping the system.

Through the example implementations described herein, it is possible to improve the agility of deploying applications which requires the data copy on container platform. In addition, this example implementation prevents data loss and corruption by avoiding conflict between written data and copied data.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software.

Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a plurality of clusters, each of the plurality of clusters independently executing a computing unit, the method comprising:
    for a request to establish a remote copy relationship to a first volume in a first cluster of the plurality of clusters:
        obtaining volume claim of the first volume from the first cluster;
        requesting a second cluster of the plurality of clusters to create a corresponding second volume having same volume configuration as the obtained volume claim of the first volume;
        obtaining volume information of the corresponding second volume from the second cluster of the plurality of clusters;
        configuring the first volume and corresponding second volume in the second cluster to have a remote copy relationship based on the obtained volume information; and
        setting access from the computing unit to the first volume and the corresponding second volume based on the remoter copy relationship,
    wherein the setting the access from the computing unit to the first volume and the corresponding second volume based on the remote copy relationship comprises:
        determining whether the access from the computing unit can be granted based on a copy status and copy claim information indicative of the purpose of remote copy;
        granting the access from the computing unit to ones of the first volume and the corresponding second volume when the determination is that access from computing unit can be granted; and
        denying the access from the computing unit to the ones of the first volume and the corresponding second volume when the determination is that access from computing unit cannot be granted, and
    wherein the determining whether the access from the computing unit to the first volume and the corresponding second volume can be granted based on the copy status and the copy claim information indicative of the purpose of the remote copy comprises:
        for the first volume and the corresponding second volume having the copy claim information indicative of a purpose of disaster recovery;
            determining that the access from the computing unit to the ones of the first volume and the corresponding second volume being a copy source having an unsuspended copy status or a copy destination having a suspended copy status can be granted; and determining that the access from the computing unit to the ones of the first volume and the corresponding second volume being the copy source having a suspended copy status or the copy destination having an unsuspended copy status cannot be granted.

2. The method of claim 1, wherein the configuring the first volume and the corresponding second volume to have the remote copy relationship and the setting the access from the computing unit to the first volume and the corresponding second volume based on the remote copy relationship is conducted for when it is determined that the second cluster contains the corresponding second volume meets conditions in the volume information.

3. The method of claim 2, wherein, for a determination that the second cluster does not have corresponding second volume meeting conditions in the volume information:

creating the corresponding second volume in the second cluster to meet the conditions in the volume information;

wherein the configuring the first volume and the corresponding second volume in the second storage cluster to have the remote copy relationship based on the obtained volume information, and the setting the access from the computing unit to the first volume and the corresponding second volume based on the remote copy relationship is conducted in response to the creating of the corresponding second volume.

4. The method of claim 1, wherein the configuring the first volume and the corresponding second volume in the second cluster to have the remote copy relationship based on the obtained volume information is conducted based on the determination that the corresponding second volume is to be configured to have the remote copy relationship with the first volume in the first cluster;

wherein the method further comprises, for the determination that the corresponding second volume is to be configured to have the remoter copy relationship with the first volume in the first cluster, obtaining volume information indicative of the plurality of volumes in the first cluster and the second cluster and obtaining claim information indicative of relationship between a plurality of volumes in the first cluster and a plurality of volumes in the second cluster.

5. The method of claim 1, further comprising determining whether setup of the remote copy of the first volume is needed, the determining comprising:

determining that a volume claim information corresponding to the first volume has a relationship with copy claim information indicative of requiring the remote copy; and determining that the setup of the remote copy of the first volume is needed if the volume claim has a relationship with the copy claim information being indicative of requiring the remote copy and the remote copy relationship has not been established against the first volume.

6. The method of claim 1, wherein the determining whether the access from the computing unit to the first volume and the corresponding second volume can be granted based on the copy status and the copy claim information indicative of the purpose of the remote copy further comprises:

for the first volume and the corresponding second volume having the copy claim information indicative of a purpose of bursting or migration:

determining that the access from the computing unit to the ones of the first volume and the corresponding second volume being a copy source having a not copied status or a copy destination having a copied status can be granted; and determining that the access from the computing unit to the ones of the first volume and the corresponding second volume being the copy source having the copied status, or the copy destination having the not copied status cannot be granted.

7. The method of claim 1, wherein the determining whether the access from the computing unit to the first volume and the corresponding second volume can be granted based on the copy status and the copy claim information indicative of the purpose of the remote copy further comprises:

for the first volume and the corresponding second volume having the copy claim information indicative of a purpose of secondary use of data, determining that the access from computing unit to volumes being the copy source or the copy destination having a copied status can be granted.

8. The method of claim 1, wherein the configuring the first volume and the corresponding second volume in the second cluster to have the remote copy relationship based on the obtained volume information comprises:

setting one of the first volume and the corresponding second volume as a copy source volume and another one of the first volume and the corresponding second volume as a copy destination volume;

determining a remote copy method based on copy claim information indicative of the purpose of the remote copy;

configuring the determined remote copy method between the copy source volume and the copy destination volume.

9. The method of claim 8, wherein the determining the remote copy method comprised:

for the copy claim information indicative of the remote copy relationship to be disaster recovery or migration, determining that the remote copy method is replication between the first volume and the corresponding second volume;

for the copy claim information indicative of the remote copy relationship to be bursting, determining that the remote copy method is transparent access path between the first volume and the corresponding second volume; and for the copy claim information indicative of the remote copy relationship to be secondary use of data, determining that the remote copy method is replication between copy destination volume and a clone of the copy source volume.

10. A non-transitory computer readable medium, storing instructions for a plurality of clusters, each of the plurality of clusters independently executing a computing unit, the instructions comprising:

for a request to establish a remote copy relationship to a first volume in a first cluster of the plurality of clusters:

obtaining volume claim of the first volume from the first cluster, requesting a second cluster of the plurality of clusters to create a corresponding second volume having same volume configuration as the obtained volume claim of the first volume;

obtaining volume information of the corresponding second volume from the second cluster of the plurality of clusters;

configuring the first volume and the corresponding second volume in the second cluster to have a remote copy relationship based on the obtained volume information; and setting access from the computing unit to the first volume and the corresponding second volume based on the remoter copy relationship, wherein the setting the access from the computing unit to the first volume and the corresponding second volume based on the remote copy relationship comprises:

determining whether the access from the computing unit can be granted based on a copy status and copy claim information indicative of the purpose of remote copy;

granting the access from the computing unit to ones of the first volume and the corresponding second volume when the determination is that access from computing unit can be granted; and denying the access from the computing unit to the ones of the first volume and the corresponding second volume when the determination is that access from computing unit cannot be granted, and wherein the determining whether the access from the computing unit to the first volume and the corresponding second volume can be granted based on the copy status and the copy claim information indicative of the purpose of the remote copy comprises:

for the first volume and the corresponding second volume having the copy claim information indicative of a purpose of disaster recovery;

determining that the access from the computing unit to the ones of the first volume and the corresponding second volume being a copy source having an unsuspended copy status or a copy destination having a suspended copy status can be granted; and determining that the access from the computing unit to the ones of the first volume and the corresponding second volume being the copy source having a suspended copy status or the copy destination having an unsuspended copy status cannot be granted.

11. An apparatus communicatively coupled to a plurality of clusters, each of the plurality of clusters independently executing a computing unit, the apparatus comprising:

a processor, configured to:

for a request to establish a remote copy relationship to a first volume in a first cluster of the plurality of clusters:

obtaining volume claim of the first volume from the first cluster, requesting a second cluster of the plurality of clusters to create a corresponding second volume having same volume configuration as the obtained volume claim of the first volume;

obtaining volume information of the corresponding second volume from the second cluster of the plurality of clusters;

configure the first volume and the corresponding second volume in the second cluster to have a remote copy relationship based on the obtained volume information; and set access from the computing unit to the first volume and the corresponding second volume based on the remoter copy relationship, wherein the setting the access from the computing unit to the first volume and the corresponding second volume based on the remote copy relationship comprises:

determine whether the access from the computing unit can be granted based on a copy status and copy claim information indicative of the purpose of remote copy;

grant the access from the computing unit to ones of the first volume and the corresponding second volume when the determination is that access from computing unit can be granted, and deny the access from the computing unit to the ones of the first volume and the corresponding second volume when the determination is that access from computing unit cannot be granted, and wherein the determine whether the access from the computing unit to the first volume and the corresponding second volume can be granted based on the copy status and the copy claim information indicative of the purpose of the remote copy comprises:

for the first volume and the corresponding second volume having the copy claim information indicative of a purpose of disaster recovery;

determine that the access from the computing unit to the ones of the first volume and the corresponding second volume being a copy source having an unsuspended copy status or a copy destination having a suspended copy status can be granted; and determine that the access from the computing unit to the ones of the first volume and the corresponding second volume being the copy source having a suspended copy status or the copy destination having an unsuspended copy status cannot be granted.

12. The method of claim 1, further comprising:

for the first volume not existing in the first cluster of the plurality of clusters, creating the first volume in the first cluster of the plurality of clusters.

* * * * *